United States Patent
Lin et al.

(10) Patent No.: US 11,255,534 B2
(45) Date of Patent: Feb. 22, 2022

(54) THERMAL MODULE AND PROJECTOR

(71) Applicant: Coretronic Corporation, Hsin-Chu (TW)

(72) Inventors: Shi-Wen Lin, Hsin-Chu (TW);
Tsung-Ching Lin, Hsin-Chu (TW);
Wei-Chi Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 163 days.

(21) Appl. No.: 16/150,270

(22) Filed: Oct. 3, 2018

(65) Prior Publication Data
US 2020/0109849 A1 Apr. 9, 2020

(51) Int. Cl.
*F21V 29/83* (2015.01)
*F21V 29/58* (2015.01)

(52) U.S. Cl.
CPC .............. *F21V 29/83* (2015.01); *F21V 29/59* (2015.01)

(58) Field of Classification Search
CPC ........... F21S 45/47; F21S 45/49; F21V 29/70; F21V 29/83; F21V 29/74; F21V 29/59; F21Y 2105/12; F21Y 2115/10; G03B 21/14; G03B 21/16; H01B 7/426
See application file for complete search history.

(56) References Cited

U.S. PATENT DOCUMENTS

| | | | | |
|---|---|---|---|---|
| 2,941,787 A * | 6/1960 | Ramen | ................. | F28D 9/0006 165/157 |
| 3,473,604 A * | 10/1969 | Tiefenbacher | ............ | F28F 3/10 165/166 |
| 3,924,441 A * | 12/1975 | Kun | ...................... | B21D 22/04 72/475 |
| 4,688,631 A * | 8/1987 | Peze | ..................... | F28D 9/0037 165/166 |
| 5,388,635 A * | 2/1995 | Gruber | ..................... | F28F 3/12 165/185 |
| 5,884,691 A * | 3/1999 | Batchelder | .............. | F28F 3/022 165/185 |
| 6,516,874 B2 * | 2/2003 | Mathur | ................. | F28D 9/0037 165/166 |
| 6,904,961 B2 * | 6/2005 | Ayres | .................... | F28D 9/0037 165/133 |

(Continued)

FOREIGN PATENT DOCUMENTS

CN  107359146  11/2017

*Primary Examiner* — Fatima N Farokhrooz
(74) *Attorney, Agent, or Firm* — JCIPRNET

(57) ABSTRACT

A thermal module and a projector using the same are provided. The thermal module comprises a heat sink and a base. The heat sink comprises a bottom, a plurality of fins, a cover, and a plurality of side walls. The fins are disposed on the bottom, and each of the fins comprises a reference plane and a plurality of protrusions, wherein adjacent two of the protrusions are convex toward opposite directions with respect to the reference plane, and rows of through holes are formed by adjacent two protrusions along a flowing direction. The cover is disposed on the fins. The side walls are disposed between the bottom and the cover and surrounding the fins, wherein a liquid is capable of flowing through the heat sink by entering the inlet and exiting by the outlet of the side walls or the cover. The bottom of the heat sink is disposed on the base.

19 Claims, 4 Drawing Sheets

(56) References Cited

U.S. PATENT DOCUMENTS

| | | | | |
|---|---|---|---|---|
| 7,228,893 B2* | 6/2007 | Matsuzaki | | F28D 9/0037 165/166 |
| 8,528,628 B2* | 9/2013 | Robinson | | F28F 21/02 165/80.4 |
| 2004/0031587 A1* | 2/2004 | Fong | | F28F 3/027 165/80.3 |
| 2004/0177949 A1* | 9/2004 | Shimoya | | F28F 1/126 165/152 |
| 2005/0121173 A1* | 6/2005 | Inagaki | | H01L 25/074 165/80.3 |
| 2006/0237178 A1* | 10/2006 | Katoh | | F28D 1/0333 165/153 |
| 2007/0051499 A1* | 3/2007 | Kaimura | | F28D 1/0391 165/104.19 |
| 2007/0053168 A1* | 3/2007 | Sayir | | H01L 23/3672 361/718 |
| 2007/0165190 A1* | 7/2007 | Takagi | | G03B 21/145 353/54 |
| 2007/0230183 A1* | 10/2007 | Shuy | | F28D 15/0275 362/294 |
| 2007/0230185 A1* | 10/2007 | Shuy | | F28F 21/04 362/294 |
| 2007/0245560 A1* | 10/2007 | Matsuzaki | | F28D 9/0037 29/890.039 |
| 2008/0164014 A1* | 7/2008 | Nakamura | | F02M 26/32 165/165 |
| 2008/0169093 A1* | 7/2008 | Ohfune | | F02M 26/11 165/164 |
| 2009/0321045 A1* | 12/2009 | Hernon | | F28F 13/003 165/80.2 |
| 2012/0006514 A1* | 1/2012 | Bratkovski | | H01L 23/367 165/121 |
| 2013/0062042 A1* | 3/2013 | Dinulescu | | F28F 9/001 165/166 |
| 2013/0114098 A1* | 5/2013 | LeGrande | | G06K 15/00 358/1.13 |
| 2013/0145612 A1* | 6/2013 | Busch | | G06F 1/182 29/601 |
| 2013/0194853 A1* | 8/2013 | Tokuyama | | H01L 25/072 363/131 |
| 2013/0264701 A1* | 10/2013 | Loong | | H01L 21/4878 257/712 |
| 2016/0377349 A1* | 12/2016 | Cool | | F24H 9/0026 165/109.1 |
| 2017/0186667 A1* | 6/2017 | Choudhury | | H01L 23/473 |
| 2019/0364694 A1* | 11/2019 | Lin | | H01L 23/473 |

* cited by examiner

THERMAL MODULE AND PROJECTOR

BACKGROUND

Technical Field

The disclosure relates to a thermal module and a projector, and more particularly, to the thermal module with effective heat dissipating effect and the projector using the same.

Description of Related Art

In recent years, the demand for projector life and brightness has gradually increased. Recently, projector light sources have gradually changed from mercury lamps to light-emitting diodes (LEDs) or lasers with high brightness and long life. However, using the aforementioned type of semiconductor light source is often accompanied with the problem of concentration of heat density because of the small size and high luminous power of the semiconductor light source, and therefore the requirements for heat dissipation technology are more demanding. In general, the fan is used to cool the light source of the projector with the heat dissipation module. However, the strategy has not solved the problem of excessive concentration of heat of the LED or the laser source. Therefore, the water-cooling technology with high heat dissipation performance is becoming more and more important.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a thermal module with effective heat dissipating effect.

The disclosure also provides a projector using the aforementioned thermal module.

In order to achieve one or a portion of or all of the objects or other objects, a thermal module is provided. The thermal module comprises a heat sink and a base. The heat sink comprises a bottom, a plurality of fins, a cover, and a plurality of side walls. The plurality of fins are disposed on the bottom, and each of the plurality of fins comprises a reference plane and a plurality of protrusions. The plurality of protrusions include first protrusions and second protrusions, wherein adjacent two of the plurality of protrusions are convex toward opposite directions with respect to the reference plane, and rows of through holes are formed by adjacent two of the plurality of protrusions along a flowing direction. The cover is disposed on the plurality of fins. The plurality of side walls are disposed between the bottom and the cover, and surrounding the plurality of fins, wherein one of the plurality of side walls or the cover has an inlet while another one of the plurality of side walls or the cover has an outlet, and a liquid is capable of flowing through the heat sink by entering the inlet and exiting by the outlet. The bottom of the heat sink is disposed on the base.

In order to achieve one or a portion of or all of the objects or other objects, a projector with the aforementioned thermal module is provided. The projector comprises a housing having a projection lens disposed thereon, a power supply disposed in the housing, an optical engine disposed in the housing and adapted to transmit light to the projection lens, a light source disposed in the housing and emitting light to the optical engine and generating heat, and the aforementioned thermal module is disposed in the housing, wherein the power supply supplies power to the light source and the optical engine. The base of the aforementioned thermal module is disposed between the bottom of the heat sink and the light source.

In one embodiment of the invention, each of the plurality of protrusions has at least two folds.

In one embodiment of the invention, a number of the at least two folds is two, and each of the plurality of protrusions further has a parallel portion parallel to the reference plane and connected between the two folds.

In one embodiment of the invention, the two folds are symmetrically formed with respect to an axis perpendicular to the parallel portion.

In one embodiment of the invention, a length of the parallel portion is greater than a vertical distance between the parallel portion and the reference plane.

In one embodiment of the invention, the heat sink satisfies a formula: $0.2D<W<0.8D$, wherein W denotes a width that each of the plurality of protrusions convex from the reference plane, and D denotes a distance between adjacent two of the plurality of fins, wherein D is greater than 1 mm and less than 3 mm.

In one embodiment of the invention, each of the plurality of fins has a height H perpendicular to the flowing direction, wherein H is greater than 10 mm and less than 30 mm.

In one embodiment of the invention, the thermal module further comprises at least one partition extended along the flowing direction and connected with one of the plurality of side walls to guide a flow of the liquid.

In one embodiment of the invention, the projector further comprises a fan, disposed in the housing.

In order to make the aforementioned and other features and advantages of the disclosure comprehensible, several exemplary embodiments accompanied with drawings are described in detail as follows.

Other objectives, features and advantages of the invention will be further understood from the further technological features disclosed by the embodiments of the invention wherein there are shown and described preferred embodiments of the invention, simply by way of illustration of modes best suited to carry out the invention.

BRIEF DESCRIPTION OF THE DRAWINGS

The accompanying drawings are included to provide a further understanding of the invention, and are incorporated in and constitute a part of the specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
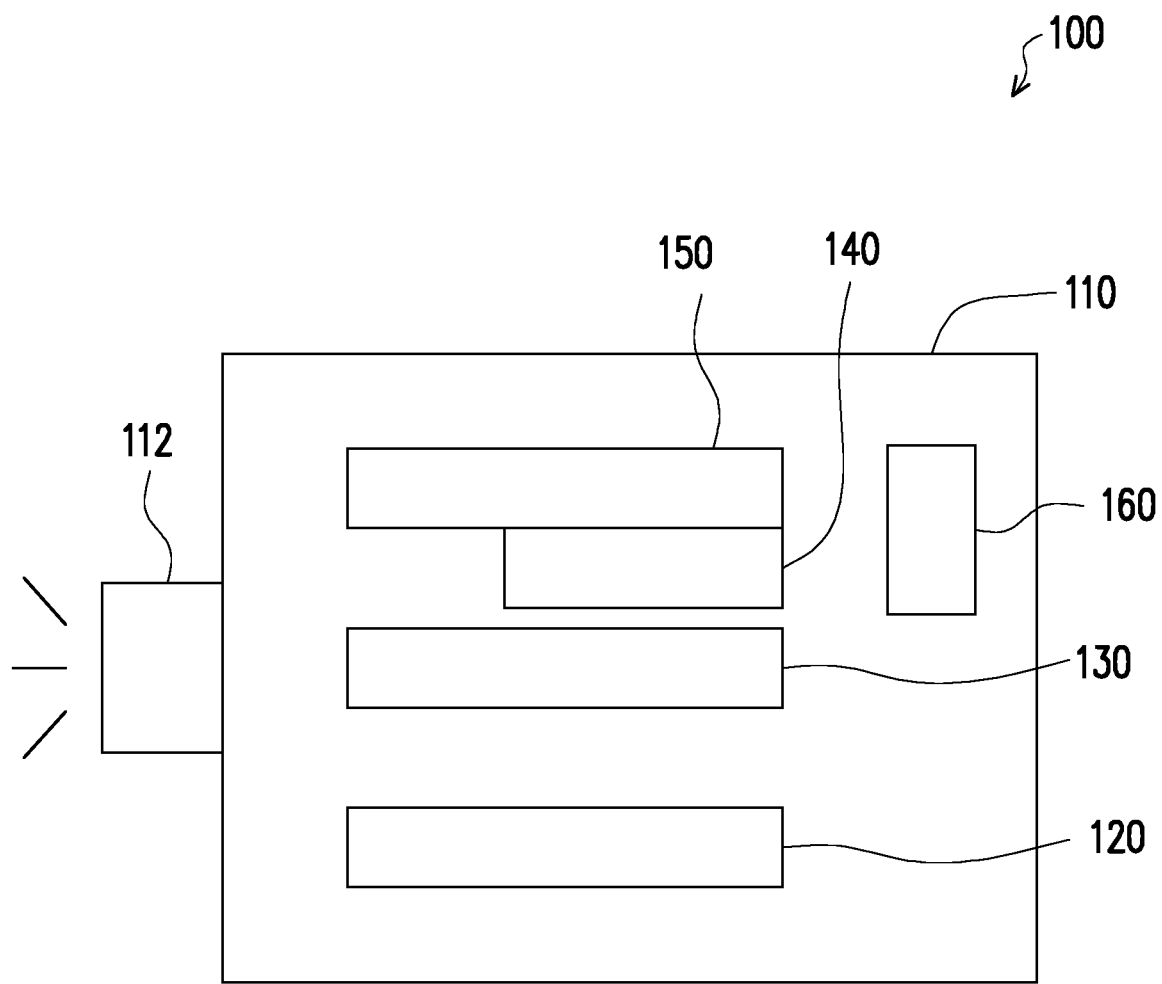
FIG. 1 illustrates a projector of an exemplary embodiment of the invention.
Figure 2:
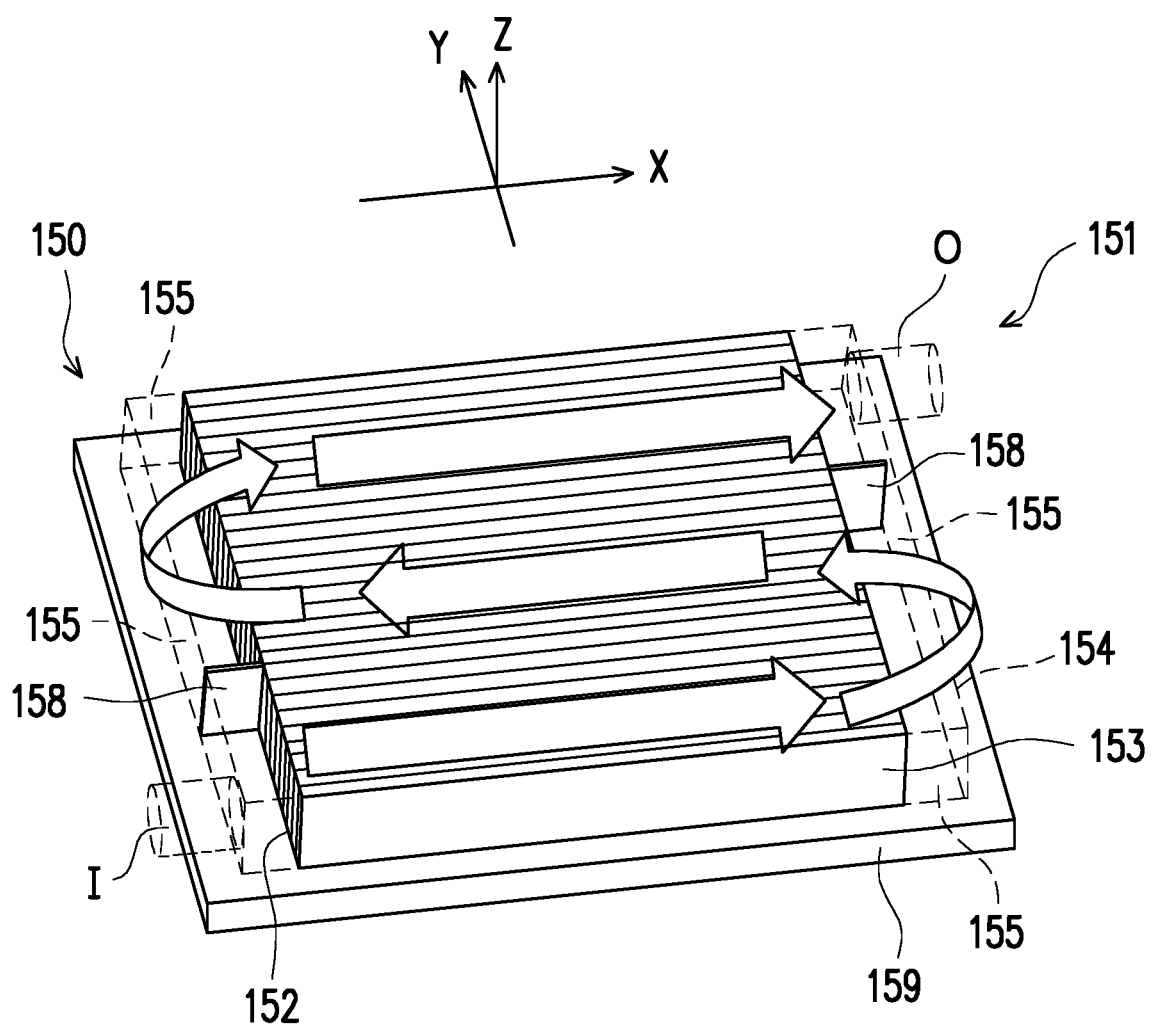
FIG. 2 illustrates a thermal module of the projector shown in FIG. 1.

FIG. 1 illustrates a projector of an exemplary embodiment of the invention. FIG. 2 illustrates a thermal module of the projector shown in FIG. 1. The projector 100 comprises a housing 110, a power supply 120, an optical engine 130, a light source 140 and a thermal module 150. The housing 110 has a projection lens 112 disposed thereon. The power supply 120, the optical engine 130, the light source 140 and the thermal module 150 are all disposed in the housing 110, wherein the optical engine 130 and the light source 140 are electrically connected to the power supply 120. When the power supply 120 supplies power to the light source 140 and the optical engine 130, the light source 140 emits light to the optical engine 130 and generates heat at the same time, the light from the light source 140 is converted and transmitted by the optical engine 130 and projected onto a projection screen (not shown) outside of the projector 100 through the projection lens 112. The thermal module 150 disposed adjacent to the light source 140 provides a heat dissipating effect to the light source 140, so as to maintain a well operation of the projector 100.

The optical engine 130 includes multiple optical elements (not shown). The optical elements may include lenses (not shown), at least one mirror (not shown), at least one dichroic mirror (not shown), a wavelength conversion element (not shown), a color filter (not shown) and a light valve (not shown). The light emitted from the light source 140 may be converted and transmitted to the projection lens 112 through the optical elements, but the invention is not limited thereto.

The light source 140 may be selected from one of light emitting diodes and a laser, dependent on actual requirement.

The thermal module 150 comprises a heat sink 151 and a base 159. The heat sink 151 comprises a bottom 152, a plurality of fins 153, a cover 154, and a plurality of side walls 155. The bottom 152 of the heat sink 151 is disposed on the base 159. The plurality of fins 153 is disposed on the bottom 152 while the bottom 152 is located between the fins 153 and the base 159. The base 159 of the thermal module 150 is disposed between the bottom 152 of the heat sink 151 and the light source 140.

Figure 3:
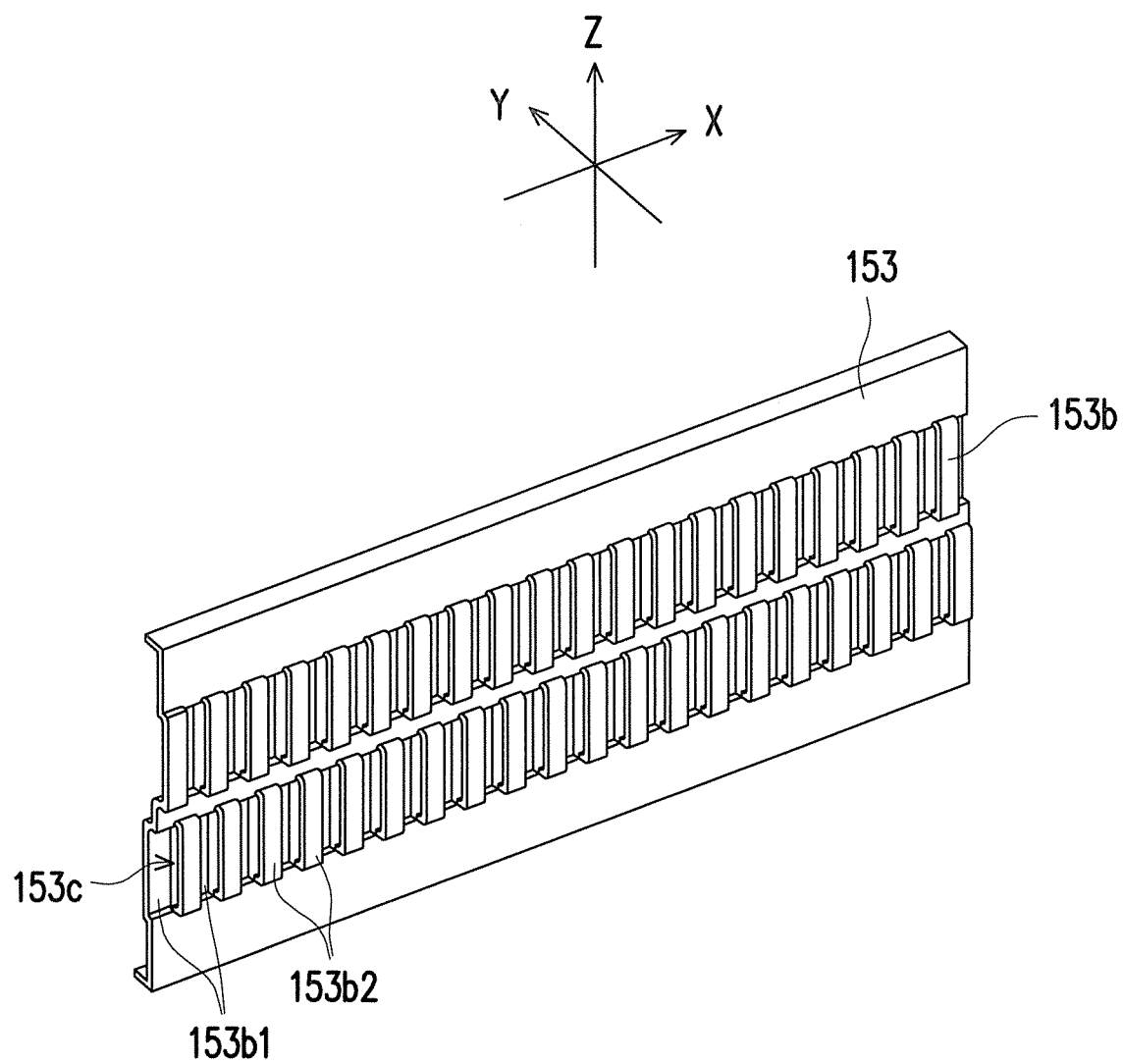
FIG. 3 is a perspective view of one fin shown in the FIG. 2.
Figure 4:
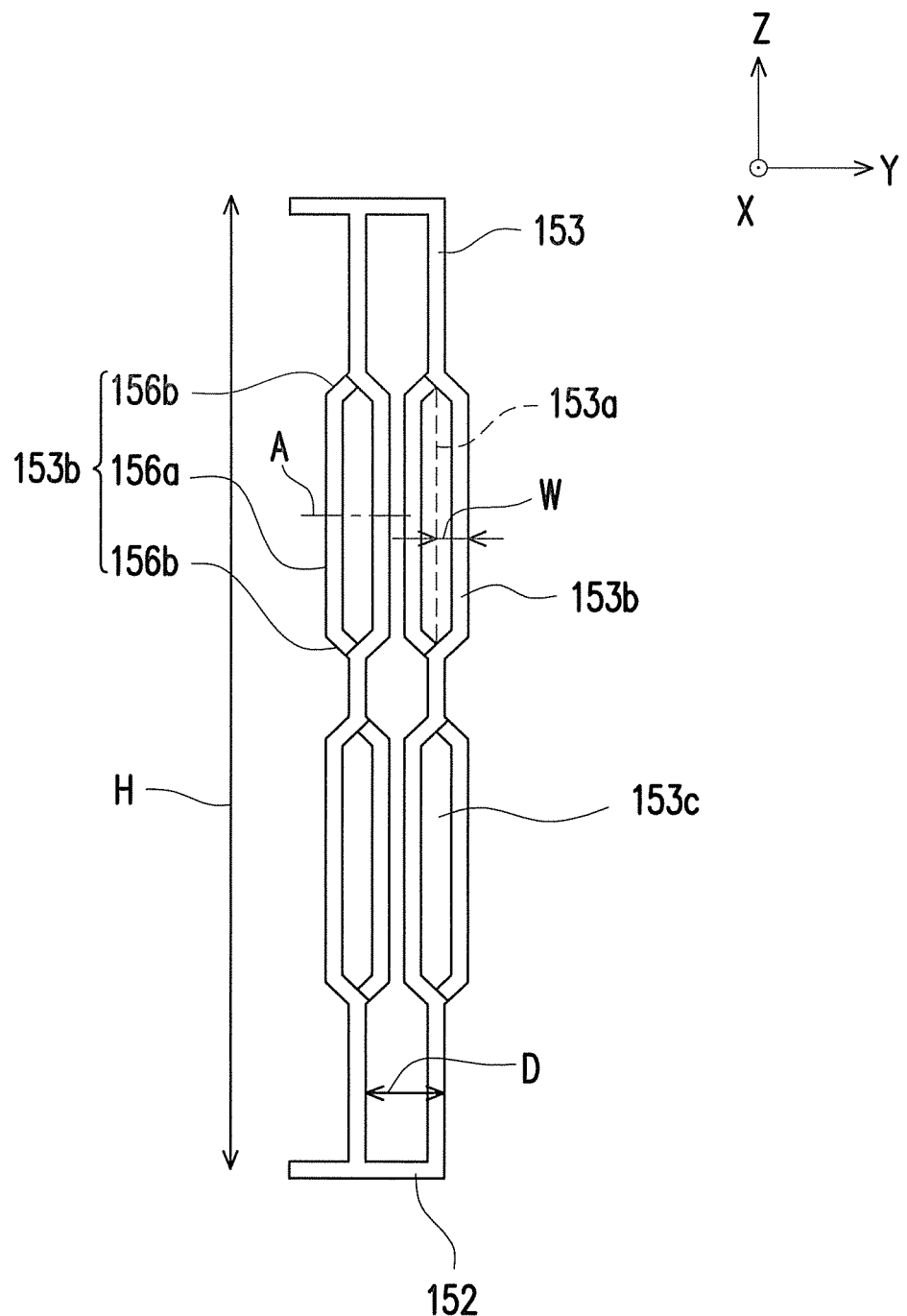
FIG. 4 is a cross-sectional view of part of the fins shown in FIG. 2.

FIG. 3 is a perspective view of one fin shown in the FIG. 2, and FIG. 4 is a cross-sectional view of part of the fins 153 shown in FIG. 2. Referring to FIGS. 2 to 4, each of the plurality of fins 153 comprises a reference plane 153a and a plurality of protrusions 153b. The plurality of protrusions 153b include first protrusions 153b1 and second protrusions 153b2, wherein adjacent two of the plurality of protrusions 153b are convex toward opposite directions with respect to the reference plane 153a, and rows of through holes 153c are formed by adjacent two of the plurality of protrusions 153b along a flowing direction of the X-axis. In detail, the protrusions 153b are convex toward opposite directions of the Y-axis. The cover 154 is disposed on the plurality of fins 153. The plurality of side walls 155 are disposed between the bottom 152 and the cover 154, and surrounding the plurality of fins 153, wherein one of the plurality of side walls 155 or the cover 154 has an inlet I while another one of the plurality of side walls 155 or the cover 154 has an outlet O.

In the embodiment, for example, the inlet I and the outlet O formed on different side walls 155 extend toward opposite directions, such that a liquid is capable of flowing through the heat sink 151 by entering the inlet I and exiting the outlet O. In another embodiment, the inlet I and the outlet O may be formed on the same one of the plurality of side walls 155. In still another embodiment, the inlet I and the outlet O may be formed on the cover 154. In still another embodiment, one of the inlet I and the outlet O may be Ruined on one of the plurality of side walls 155, and the other one of the inlet I and the outlet O may be formed on the cover 154.

In the embodiment, any adjacent two protrusions 153b are convex toward opposite directions of the Y-axis. The adjacent two protrusions 153b may be one protrusion 153b and the next one protrusion 153b arranged along the flowing direction of the X-axis. Also, the adjacent two protrusions 153b may be one protrusion 153b and the next one protrusion 153b arranged along a height direction of the Z-axis of the fins 153. Therefore, rows of through holes 153c are formed along the flowing direction of the X-axis while a zigzag shape is formed along the height direction of the Z-axis on a same fin 153, wherein the height direction of the Z-axis is perpendicular to the flowing direction of the liquid of the X-axis. In detail, each of the plurality of protrusions 153b has a parallel portion 156a parallel to the reference plane 153a and two folds 156b bended from the parallel portion 156a toward and connected to the reference plane 153a. As shown in FIG. 4, the two folds 156b are symmetrically formed with respect to an axis A perpendicular to the parallel portion 156a. A length of the parallel portion 156a is greater than a vertical distance W between the parallel portion 156a and the reference plane 153a, such that a shape of the through hole 153c that facilitates the uniformity of the flow velocity of a liquid flowing through the through hole 153c may be formed, and the uniformity of the heat exchange of the liquid may be enhanced consequently. The number of folds 156b is not limited by the disclosure and can be different as the size of the fins 153 or the protrusions 153b are changed.

Each of the plurality of fins 153 has a size with a height H, which ranges from 10 mm to 30 mm. Besides, the heat sink 151 satisfies a formula: 0.2D<W<0.8D, wherein W denotes a width that each of the plurality of protrusions 153b convex from the reference plane 153a (the vertical distance W mentioned above), and D denotes a distance between adjacent two of the plurality of fins 153. To be specific, W is measured from the outer edge of each of the plurality of protrusions 153b to the reference plane 153a, and D is measured from the outer edge of one of the plurality of fins 153 to the outer edge of the adjacent one of the plurality of fins 153. In the embodiment, the distance D between adjacent two of the plurality of fins 153 is greater than 1 mm and less than 3 mm. It should be noted that, the ranges of D, W and H would be varied as long as the size of the heat sink 151 varies, and people skilled in the art should understand that the size of the heat sink 151 varies with sorts of light source 140, or other possible factors.

Referring to FIG. 1, when the projector 100 operates, the power supply 120 supplies power to the light source 140 and the optical engine 130. The light emitted from the light source 140 into the optical engine 130 is converted into an image by the optical engine 130 and projected onto a projection screen (not shown) outside of the projector 100 through the projection lens 112. The light source 140 generates heat when emits light, and the heat may be accumulating in and around the heat sink 151.

Referring to FIGS. 2 to 4, the bottom 152, the cover 154 and the side walls 155 form an accommodation space, and the fins 153 are located in the accommodation space. A liquid, take water or coolant for example, is poured into the heat sink 151 by the inlet I, flows through the fins 153 for dissipating the heat produced by the projector 100 and exits by the outlet O. More specifically, when the liquid flows through the fins 153 in the accommodation space, the liquid not only passes through the gap between any two adjacent fins 153 but also passes through the rows of the through holes 153c formed on the fins 153 along the flowing direction of the X-axis. The heat exchange between the liquid and the fins 153 in the accommodation space is performed by conduction, and the heat exchange between the liquid and hot air accumulating in and around the heat sink 151 is performed by convection.

It should be noted that the protrusions 153b interrupts the flow, therefore vortexes are formed near the protrusions 153b, and such that the heat exchange of the liquid would be more uniformly by the vortexes.

For enhancing the heat dissipating effect of the thermal module 150, the thermal module 150 may further include at least one partition 158. The partition 158 is disposed between the fins 153, connected with one of the plurality of side walls 155 and extending along the flowing direction of the X-axis for guiding the flow of the liquid. As shown in FIG. 2, for example, two partitions 158 are disposed for guiding the liquid to do a U-turn two times, and the heat sink 151 is defined as in a three-loop form. In contrast, the heat sink 151 with no partitions 158 is defined as in a one-loop form.

The following Tables 1 and 2 show a pressure drop and a thermal resistance of different heat sink design when the liquid is supplied as a low flow rate and a high flow rate.

TABLE 1

(low flow rate)

| Fins Form (heat sink form) | fins without the protrusions (three-loop) | fins without the protrusions (one-loop) | fins with the protrusions (fins 153 of the embodiment) (one-loop) |
|---|---|---|---|
| Flow rate(LPM) | | 5.6 | |
| Pressure drop(Pa) | 3255 | 990 | 1309 |
| | 100% | 30% | 40% |
| Thermal resistance (° C./W) | 0.0112 | 0.0122 | 0.0104 |
| | 100% | 109% | 93% |

TABLE 2

(high flow rate)

| Fins Form (heat sink form) | fins without the protrusions (three-loop) | fins without the protrusions (one-loop) | fins with the protrusions (fins 153 of the embodiment) (one-loop) |
|---|---|---|---|
| Flow rate(LPM) | | 12.0 | |
| Pressure drop(Pa) | 9633 | 3720 | 4642 |
| | 100% | 39% | 48% |
| Thermal resistance (° C./W) | 0.0095 | 0.0107 | 0.0088 |
| | 100% | 113% | 93% |

Referring to Table 1, though the pressure drop of the heat sink 151 in the one-loop formed with its fins 153 having the protrusions 153b of the embodiment is far less than that of the heat sink in the three-loop with its fins having no protrusions 153b, the thermal resistance reduces 7%. On the other hand, compared with the pressure drop and the thermal resistance of the heat sink in the one-loop with its the fins having no protrusions 153b, the pressure drop of the heat sink 151 in the one-loop formed with its fins 153 having the protrusions 153b of the embodiment is raised up 10%, the thermal resistance is reduced 16%. Thus, an effect of heat dissipating of the heat sink 151 is getting better, and the well operation of the projector 100 could be maintained.

In addition, as shown in the Table 2, the effect of the heat dissipating of the heat sink 151 operated at a high flow rate is also improved on the whole.

Furthermore, the projector 100 may further comprise a fan 160, which is disposed in the housing 110, adjacent to the thermal module 150, and electrically connected to the power supply 120. The fan 160 provides a forced convection to the thermal module 150, thus the heat accumulating around the heat sink 151 may be dissipated by the fan 160, and therefore the effect of dissipating heat may be further enhanced.

In summary, the protrusions of the fins form the rows of through holes along the flowing direction, the rows of through holes serve as auxiliary channels for liquid flowing therethrough and provide well heat dissipating effect. In addition, vortexes are formed when the liquid flow passes the protrusions, and the vortexes make the heat exchange of the liquid much more uniformly, so as to improve the water-cooling effect. Therefore, the thermal module having the fins with the protrusions provides effective heat dissipating and water-cooling effect, and the life of the projector using the thermal module is extend.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from the disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A thermal module, comprising: a heat sink, comprising: a bottom; a plurality of fins, disposed on the bottom, each of the plurality of fins comprising a reference plane and a plurality of protrusions, the reference plane being formed by a flowing direction x and a height direction z perpendicular to the flowing direction, the plurality of protrusions comprising first protrusions and second protrusions, the first protrusions and the second protrusions being arranged along the flowing direction in a first row, wherein in the first row, the first protrusions and the second protrusions are convex in the opposite directions perpendicular to the reference plane, wherein any adjacent two first protrusions in the first row are separated with each other along the flowing direction, any adjacent two second protrusions in the first row are separated with each other along the flowing direction, wherein each of the plurality of fins further comprises a plurality of protrusions in a second row, wherein the first row is located between the second row and the bottom, and the plurality of protrusions in the second row comprise first protrusions and second protrusions, the first protrusions and the second protrusions are arranged along the flowing direction in the second row, wherein the first protrusions in the first row and the first protrusions in the second row are arranged in the staggered manner along the height direction, and the second protrusions in the first row and the second protrusions in the second row are arranged in the staggered manner along the height direction, through holes of the first row and the second row are formed by a distance between the first protrusions and the second protrusions in the first row and a distance between the first protrusions and the second protrusions in the second row along the flowing direction; a cover, disposed on the plurality of fins; a plurality of side walls, disposed between the bottom and the cover, and surrounding the plurality of fins, wherein one of the plurality of side walls or the cover has an inlet while another one of the plurality of side walls or the cover has an outlet, a liquid is capable of flowing through the heat sink by entering the inlet and exiting by the outlet; and a base, the bottom of the heat sink is disposed on the base.

2. The thermal module according to the claim 1, wherein each of the plurality of protrusions has at least two folds.

3. The thermal module according to the claim 1, wherein the heat sink satisfies a formula: $0.2D<W<0.8D$, and W denotes a width that each of the plurality of protrusions convex from the reference plane; and D denotes a distance between adjacent two of the plurality of fins.

4. The thermal module according to the claim 1, further comprising at least one partition, extended along the flowing direction and connected with one of the plurality of side walls to guide a flow of the liquid.

5. The thermal module according to the claim 2, wherein a number of the at least two folds is two, and each of the plurality of protrusions further has a parallel portion parallel to the reference plane and connected between the two folds.

6. The thermal module according to the claim 5, wherein the two folds are symmetrically formed with respect to an axis perpendicular to the parallel portion.

7. The thermal module according to the claim 6, wherein a length of the parallel portion is greater than a vertical distance between the parallel portion and the reference plane.

8. The thermal module according to the claim 3, wherein D is greater than 1 mm and less than 3 mm.

9. The thermal module according to the claim 3, wherein each of the plurality of fins has a height H perpendicular to the flowing direction, wherein H is greater than 10 mm and less than 30 mm.

10. A projector, comprising: a housing, having a projection lens disposed thereon; a power supply, disposed in the housing; an optical engine, disposed in the housing and adapted to transmit light to the projection lens; a light source, disposed in the housing, emitting light to the optical engine and generating heat, wherein the power supply supplies power to the light source and the optical engine; a thermal module, disposed in the housing and comprising: a heat sink, comprising: a bottom; a plurality of fins, disposed on the bottom, each of the plurality of fins comprising a reference plane and a plurality of protrusions, the reference plane being formed by a flowing direction x and a height direction z perpendicular to the flowing direction, the plurality of protrusions comprising first protrusions and second protrusions, the first protrusions and the second protrusions being arranged along the flowing direction in a first row, wherein in the first row, the first protrusions and the second protrusions are convex in the opposite directions perpendicular to the reference plane, wherein any adjacent two first protrusions in the first row are separated with each other along the flowing direction, any adjacent two second protrusions in the first row are separated with each other along the flowing direction, wherein each of the plurality of fins further comprises a plurality of protrusions in a second row, wherein the first row is located between the second row and the bottom, and the plurality of protrusions in the second row comprise first protrusions and second protrusions, the first protrusions and the second protrusions are arranged along the flowing direction in the second row, wherein the first protrusions in the first row and the first protrusions in the second row are arranged in the staggered manner along the height direction, and the second protrusions in the first row and the second protrusions in the second row are arranged in the staggered manner along the height direction, through holes of the first row and the second row are formed by a distance between the first protrusions and the second protrusions in the first row and a distance between the first protrusions and the second protrusions in the second row along the flowing direction; a cover, disposed on the plurality of fins; a plurality of side walls, disposed between the bottom and the cover, and surrounding the plurality of fins, wherein one of the plurality of side walls or the cover has an inlet while another one of the plurality of side walls or the cover has an outlet, a liquid is capable of flowing through the heat sink by entering the inlet and exiting by the outlet; and a base, disposed between the bottom of the heat sink and the light source.

11. The projector according to the claim 10, wherein each of the plurality of protrusions has at least two folds.

12. The projector according to the claim 10, wherein the heat sink satisfies a formula: $0.2D<W<0.8D$, and
W denotes a width that each of the plurality of protrusions convex from the reference plane, and D denotes a distance between adjacent two of the plurality of fins.

13. The projector according to the claim 10, wherein the thermal module comprises at least one partition, extended along the flowing direction and connected with one of the plurality of side walls to guide a flow of the liquid.

14. The projector according to the claim 10, further comprising a fan, disposed in the housing.

15. The projector according to the claim 11, wherein a number of the at least two folds is two, and each of the plurality of protrusions further has a parallel portion parallel to the reference plane and connected between the two folds.

16. The projector according to the claim 15, wherein the two folds are symmetrically formed with respect to an axis perpendicular to the parallel portion.

17. The projector according to the claim 16, wherein a length of the parallel portion is greater than a vertical distance between the parallel portion and the reference plane.

18. The projector according to the claim 12, wherein D is greater than 1 mm and less than 3 mm.

19. The projector according to the claim 12, wherein each of the plurality of fins has a height H perpendicular to the flowing direction, wherein H is greater than 10 mm and less than 30 mm.

* * * * *